United States Patent [19]

Tricini et al.

[11] 3,734,458

[45] May 22, 1973

[54] GATE VALVE

[75] Inventors: John D. Tricini, Greensburg; Edward L. Schmitt, Pittsburgh, both of Pa.

[73] Assignee: Kerotest Manufacturing Corp., Pittsburgh, Pa.

[22] Filed: May 11, 1971

[21] Appl. No.: 142,185

[52] U.S. Cl. ..................251/267, 251/274, 251/330
[51] Int. Cl. ..............................................F16k 31/50
[58] Field of Search......................251/264, 265, 266, 251/267, 273, 274, 330

[56] References Cited

UNITED STATES PATENTS

| | | | |
|---|---|---|---|
| 1,727,300 | 9/1929 | Stevenson | 251/264 |
| 2,059,078 | 10/1936 | Allred | 251/266 X |
| 2,426,392 | 8/1947 | Fennema | 251/267 X |
| 2,797,063 | 6/1957 | Hobbs | 251/266 X |

FOREIGN PATENTS OR APPLICATIONS

| | | | |
|---|---|---|---|
| 1,146,237 | 5/1957 | France | 251/267 |

*Primary Examiner*—Martin P. Schwadron
*Assistant Examiner*—David R. Matthews
*Attorney*—Stanley J. Price, Jr.

[57] ABSTRACT

The gate valve has a body portion with coaxial inlet and outlet openings in the side walls and valve body chamber with opposed converging valve seats. A wedge member has a body portion with a depending wedge shaped gate portion that is movable vertically into a valve chamber within the body portion to control the flow of fluid through the valve body portion. A cover member is secured to the upper face of the valve body and has an elongated chamber communicating with the valve chamber in which the wedge member moves vertically. A guide pin and valve stem are positioned within a cover chamber in spaced parallel relation to each other and on opposite sides of the longitudinal axis of the gate portion of the wedge member. The wedge member body portion has a longitudinal passageway on one side of the gate portion through which the guide pin extends. The wedge member body portion has a second vertical threaded passageway on the other side of the wedge member gate portion through which the threaded valve stem extends. Rotation of the valve stem moves the wedge member vertically within the chamber of the cover in a manner that the gate portion of the wedge control the flow of fluid through the valve body chamber. The valve body, because of the offset stem configuration, is relatively short in length and may be positioned between closely adjacent pipe flanges.

8 Claims, 1 Drawing Figure

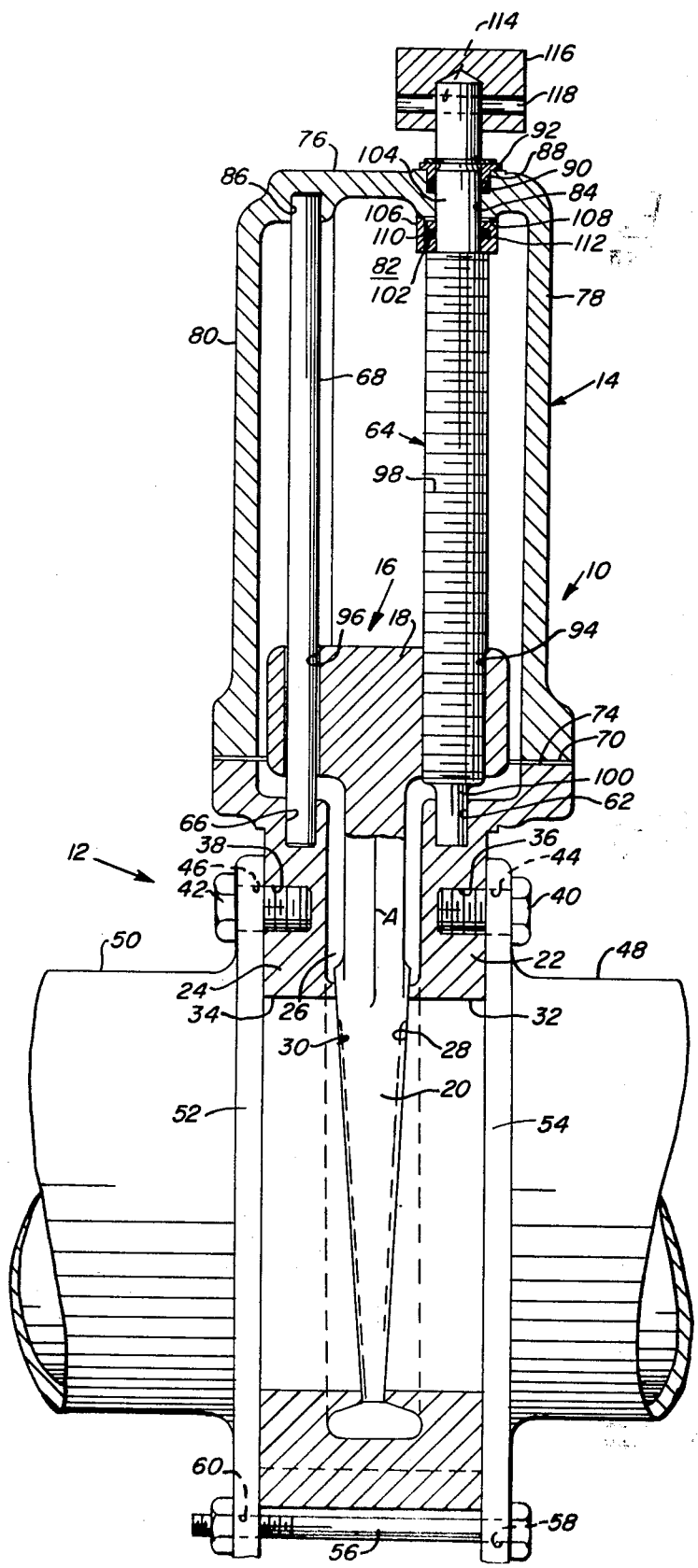

GATE VALVE

BACKGROUND OF THE INVENTION

1. Field of the Invention

This invention relates to a gate valve and more particularly to a gate valve having a valve body of relatively short length and an offset valve stem.

2. Description of the Prior Art

Valves having stems offset laterally from the valve member are known, as disclosed in U.S. Pat. No. 104,037. Slide valves having offset stems are also known, as disclosed in U.S. Pat. No. 2,787,348. Irrigation gates, as disclosed in U.S. Pat. No. 1,830,999, include a stem offset laterally from the valve member. The offset position of the valve stem relative to the valve member in the prior art valves are for purposes other than reducing the length of the valve body. Other conventional gate valves require valve bodies of substantial length to provide the necessary structural features in supporting the valve member.

SUMMARY OF THE INVENTION

The invention is directed to a gate valve that has a valve body with fluid inlet and outlet openings. A wedge member has a body portion with a gate portion depending downwardly therefrom. The gate portion is arranged to move vertically in the valve body and control the flow of fluid therethrough. A cover member positioned on the valve body has a chamber therein to receive the wedge member. The wedge member has a first vertical passageway therethrough spaced laterally on one side of the wedge member gate portion. A guide pin is mounted vertically in the chamber and extends through the wedge member body portion vertical passageway. The wedge member body portion has a second threaded vertical passageway therethrough that is spaced laterally on the other side of the wedge member gate portion. A valve stem is mounted vertically in the chamber and extends through the second threaded vertical passageway. The valve stem is operable upon rotation to move the wedge member vertically and control the flow of fluid through the valve body.

The valve body length is substantially less than the diameter and the valve is arranged to be positioned between closely adjacent flange portions of axially aligned pipe sections.

Accordingly, the principal object of this invention is to provide a gate valve that has a relatively short body portion and may be positioned between closely adjacent pipe flanges.

Another object of this invention is to provide a gate valve in which the valve stem is laterally offset from the valve gate.

These and other objects and advantages of this invention will be more completely disclosed and described in the following specification, the accompanying drawings and the appended claims.

BRIEF DESCRIPTION OF THE DRAWING

The drawing is a view in vertical section of my improved gate valve illustrating the gate portion of the wedge member in a closed position.

DESCRIPTION OF THE PREFERRED EMBODIMENT

The gate valve generally designated by the numeral 10 has a valve body portion 12 and a cover portion 14. A wedge member generally designated by the numeral 16 has a body portion 18 and a depending wedge shaped gate 20.

The valve body portion 12 has a pair of spaced side walls 22 and 24 forming a valve chamber 26 therebetween. The valve chamber has annular inwardly converging walls on valve seats 28 and 30 against which the outer surfaces of the wedge shaped gate 20 are arranged to abut in a closed position to close the valve chamber 26.

The valve body portion side walls 22 and 24 have a pair of aligned circular openings 32 and 34 which, for convenience, will be referred to as inlet opening 32 and outlet opening 34. The valve body portion side walls each have a pair of threaded tapped holes 36 and 38 that are arranged to receive bolts 40 and 42 that extend through mating holes 44 and 46 in flanges of pipe sections 48 and 50. The pipe flanges 52 and 54 are of generally circular configuration and are secured at their lower end by a plurality of bolts 56 extending through aligned holes 58 and 60 in the respective flanges 52 and 54. With this arrangement the valve body portion 12 is secured to the flanges of aligned adjacent pipe sections. It should be noted that the length of valve body portion 12 is substantially less than its circumference or width so that the valve body portion can be positioned between the closely adjacent flanged end portions of aligned pipe sections.

The valve body portion wall 22 has a cylindrical recessed portion 62 therein that is arranged to receive the end portion of valve stem 64. Similarly, the wall 24 has a cylindrical recessed portion 66 that is arranged to receive the lower end portion of a stabilizing guide pin 68.

The body portion 12 has a generally rectangular top wall 70 to which there is secured by bolts a cover member 14. The cover 14 has a generally inverted cup shaped configuration with a bottom wall 74 that mates with the upper surface 70 of valve body portion 12. Suitable bolts (not shown) are provided to secure the cover 14 to the valve body portion 12. The cover 14 has a top wall 76 and side walls 78 and 80 that form a chamber 82 that communicates with valve chamber 26. The top wall 76 has a valve stem passageway 84 therethrough and a cylindrical recessed portion 86 in which the other end portion of the guide pin 68 is positioned. The valve stem passageway 84 has an enlarged portion 88 in which there is positioned an O-ring seal 90 and a seal retainer or gland 92.

The wedge member 16 has a body portion 18 from which the wedge type valve gate 20 depends. The valve gate has a vertical axis generally designated by the letter A. On one side of the vertical axis A of the wedge member 20 the wedge member body portion 18 has a threaded passageway 94 through which the stem 64 extends. On the opposite side of the vertical axis A of the wedge member 20 the body portion 18 has another vertical passageway 96 through which the guide pin 68 extends.

The valve stem 64 has an externally threaded body portion 98 and a lower end portion 100 of reduced diameter that extends into the cylindrical recessed portion 62 of valve body 12. The stem has a shoulder portion 102 and an upper end portion 104 of reduced diameter that extends through passageway 84. A thrust washer 106 is positioned around the valve stem upper portion 104 and abuts the shoulder 102. The opposite end of the thrust washer 106 abuts an annular depending shoulder 108 in the top wall 76 surrounding the passageway 84. There is an annular recessed portion 110 in the thrust washer 106 in which there is positioned an O-ring 112. The thrust washer 106 also serves as a back seal to permit the removal and replacement of the outer O-ring seal 88 while the valve 10 is open. The upper portion of the stem 104 has a transverse pin passageway 114 and a square or block member 116 has a mating vertical recess therein and is positioned on the upper end of stem 64. A shear pin 118 extends through a transverse passageway in block 116 and the passageway 114 in stem 64 and is arranged to shear when excess torque is exerted on the stem 64.

The guide pin 68 extends through the vertical passageway 96 in the wedge body portion 18 and has one end positioned in cylindrical recess 66 of body portion 12 and the other end positioned in the axially aligned opposite recess 86 in cover top wall 76.

With the above arrangement the wedge 16 is guided vertically and stabilized by the guide pin 68 positioned along one side of the wedge 16. The actuating stem 64 extends through the threaded passageway 94 in the wedge body portion 18 on the opposite side of the wedge 20. The guide pin 68 and stem 64 are arranged in parallel spaced relation to each other and are parallel to the longitudinal axis of the wedge 20.

With this arrangement rotation of stem 64 moves the wedge 16 vertically on both the guide pin 68 and the stem 64 to open and close the opening between valve inlet 32 and valve outlet 34. The guide pin 68 stabilizes the wedge member 16 as it moves vertically in the cover 14 and prevents binding of the valve stem 64 in the wedge member body portion 18. When the wedge 16 is in a full open position, the upper surface of the body portion 18 abuts the under side of the thrust washer 106. The offset arrangement of the stem 64 and guide pin 68 permit the valve body portion to have a relatively short length so that it can be positioned between two closely adjacent flanges of aligned pipe sections. The valve 10 with a minimum length provides a means to control flow of fluids through the respective pipe sections 48 and 50.

According to the provisions of the patent statutes, we have explained the principle, preferred construction and mode of operation of our invention and have illustrated and described what we now consider to represent its best embodiment. However, it should be understood that, within the scope of the appended claims, the invention may be practiced otherwise than as specifically illustrated and described.

We claim:

1. A gate valve comprising,
   a valve body having fluid inlet and outlet openings with a valve chamber therebetween,
   a wedge member having a body portion with a gate portion depending therefrom,
   said gate portion arranged to move vertically in said valve chamber and control the flow of fluid therethrough,
   a cover member positioned on said valve body,
   said cover member having a chamber therein to receive said wedge member,
   said wedge member body portion having a first vertical passageway therethrough spaced laterally on one side of said gate portion,
   a guide pin mounted vertically in said valve cover member chamber and extending through said wedge member body portion, said guide pin terminating above said valve chamber, said guide pin arranged to guide said wedge member at a location remote from said valve chamber,
   said wedge member body portion having a second threaded vertical passageway therethrough spaced laterally on the other side of said gate portion, and
   a valve stem mounted vertically in said chamber and extending through said second threaded vertical passageway,
   said valve stem operable upon rotation to move said wedge member vertically and control the flow of fluid through said valve body.

2. A gate valve as set forth in claim 1 in which,
   said wedge member gate portion having a vertical axis,
   said cover member having a top wall with a guide pin recessed portion on one side of said gate portion vertical axis,
   said cover member top wall having a valve stem passageway therethrough on the other side of said gate portion vertical axis.

3. A gate valve as set forth in claim 2 in which,
   said valve body having a pair of spaced side walls and a top wall,
   said top wall having a guide pin recessed portion therein on one side of said gate portion vertical axis,
   said top wall having a valve stem recessed portion therein on the other side of said gate portion vertical axis.

4. A gate valve as set forth in claim 3 in which,
   said wedge member body portion is positioned in said cover member chamber,
   said guide pin having end portions positioned in said guide pin recessed portions in said valve body portion and said cover member to wall,
   said valve stem having one end portion positioned in said valve body valve stem recessed portion and the other end portion extending through said valve stem passageway in said cover member top wall.

5. A gate valve as set forth in claim 1 in which,
   said guide pin and said valve stem are arranged in parallel spaced relation to each other on opposite sides of said wedge member gate portion.

6. A gate valve as set forth in claim 4 which includes,
   a thrust washer positioned on said valve stem and abutting said cover member top wall,
   said thrust washer having an annular seal member extending around said valve stem,
   said thrust washer operable to abut said wedge body portion in a valve open position.

7. A gate valve as set forth in claim 4 which includes,
   a seal member positioned in a receiving portion of said cover member valve stem passageway and extending around said valve stem,
   a gland member engaging said seal member and maintaining said seal member within said valve stem passageway.

8. A gate valve as set forth in claim 1 in which,
   said valve body has a length substantially less than the circumference of said valve body.

* * * * *